Feb. 23, 1954 — R. P. SCHERER ET AL — 2,670,121
FLEXIBLE FOLLOWER FOR METAL AMPOULES
Filed Jan. 31, 1951
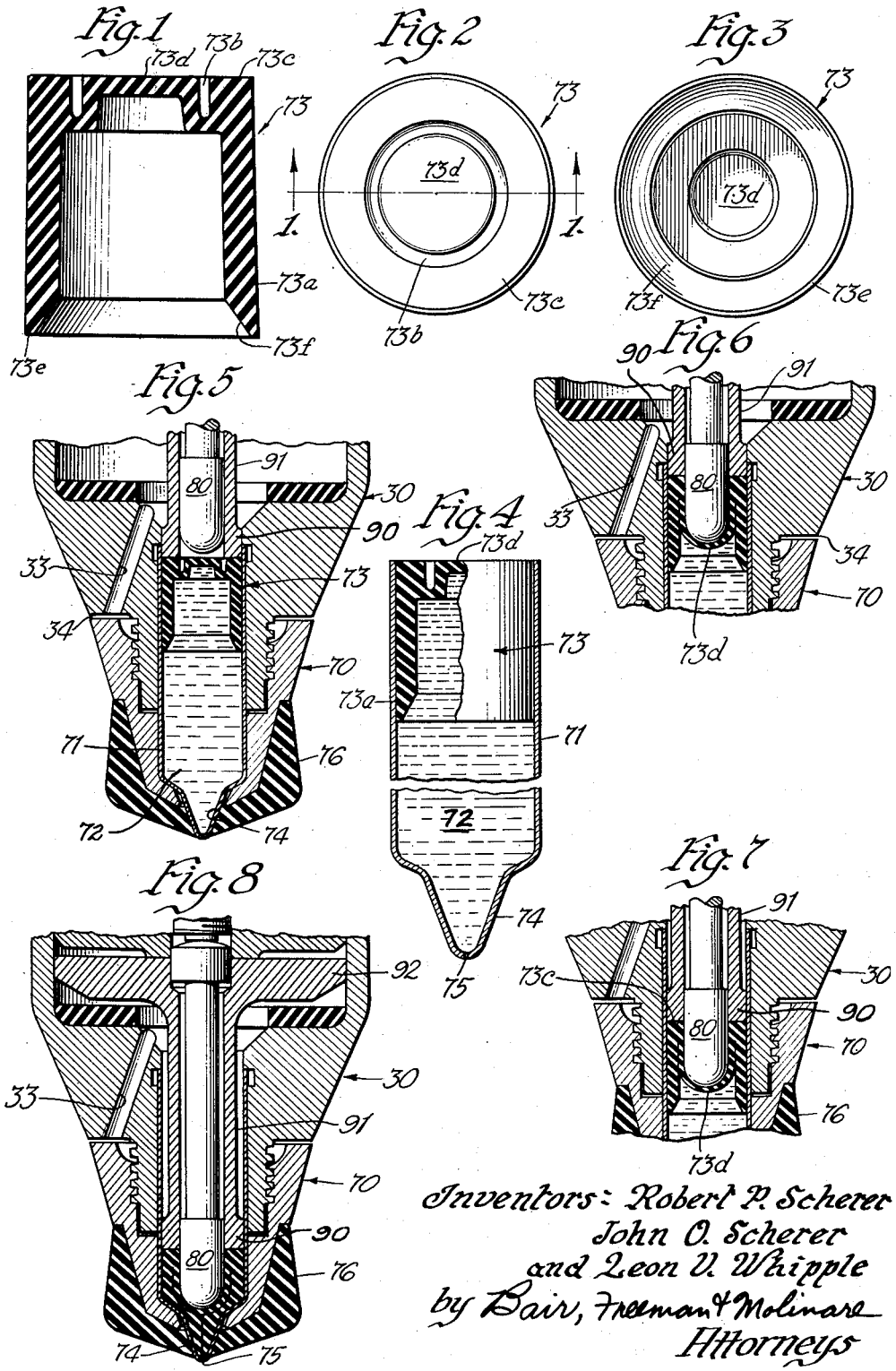
Inventors: Robert P. Scherer, John O. Scherer and Leon V. Whipple
by Bair, Freeman & Molinare
Attorneys Patented Feb. 23, 1954

2,670,121

UNITED STATES PATENT OFFICE 2,670,121

FLEXIBLE FOLLOWER FOR METAL AMPOULES

Robert Pauli Scherer, Detroit, John Otto Scherer, Grosse Pointe, and Leon V. Whipple, Berkley, Mich., assignors to R. P. Scherer Corporation, Detroit, Mich., a corporation of Michigan Application January 31, 1951, Serial No. 208,676

2 Claims. (Cl. 128—272)

This invention relates to a stopper for an ampule for use in an injector for hypodermically injecting fluid by the jet therapy method disclosed in the copending application of Robert P. Scherer, Serial No. 77,517, filed February 21, 1949. The invention also relates to the combination of said stopper with an ampule of the type indicated. An elementary form of hypo jet injector is disclosed in a second copending application of Robert P. Scherer, Serial No. 94,579, filed May 29, 1949, while a more elaborate form of hypo jet injector is disclosed in a third copending application of Robert P. Scherer, Serial No. 170,101, filed June 24, 1950. The injectors of said copending applications use a hypo jet ampule of the type disclosed and claimed in a fourth copending application of Robert P. Scherer, Serial No. 93,282, filed May 14, 1949.

One form of hypo jet injector disclosed in said copending applications may be of generally elongated shape and may be provided at its lower end with an ampule holder allowing one end of a generally tubular ampule to project outside the holder for contact with the skin when an injection is made. This end of the ampule may be formed as a more or less tapering nozzle having at its top a minute discharge orifice. The fluid to be injected is kept within the ampule by a closure member disposed in the open ampule end. This closure member is not removed when the ampule is inserted into the ampule holder forming part of the injector. In the operation of the injector, the closure member is forcibly moved downwardly within the ampule and thus acts as a plunger to eject the ampule contents through the minute discharge orifice. More particularly, injection is effected in two stages. In the first stage injection is effected under high pressure, sometimes as high as 10,000 lbs. per square inch. In the second stage, injection is continued under a pressure that, while reduced, still is relatively high, say, about 3,000 lbs. per square inch. Both stages of injection are completed within a very short period of time, on the order of a fraction of a second. Further, the injector members operative to eject the ampule content in such stages include a primary plunger slidable within a tubular secondary plunger. Before the injection, the secondary plunger contacts the outer margin of the closure member to hold it against retrograde movement, while the primary plunger is spaced from the center of the closure member. Plunger movement is effected by suddenly releasing energy that may be stored, for instance, in springs.

Upon release of the operating energy the primary plunger alone is first driven forward a limited distance by the whole driving energy while the annular secondary plunger is held against retrograde motion. This causes the center portion of the bottom of a stopper constructed according to the present invention to be driven inward, thereby being inverted and, to a very small measure, stretched, as disclosed in detail herein below. This initial action causes a small reduction in the internal volume of the ampule which is comparable to the effect created by a similar movement of a small diameter piston and so produces the very high hydraulic pressure involved in the primary injection.

Upon completion of this preliminary movement of the small primary plunger only through its predetermined length of initial travel, the driving mechanism, without stopping, also engages the annular secondary plunger, which in the first stage was held against retrograde movement, and advances primary and secondary plungers in unison throughout the remainder of the injection. The net effect of this subsequent action is that the effective piston diameter has been increased to approximately three times the area acted on by primary plunger alone with the result that the hydraulic pressure is reduced to about one-third of that produced by the primary plunger alone, while the volume of fluid moved through the orifice per unit length of plunger travel is now about three times as great as in the primary stage.

Said copending application, Serial No. 93,282, relates, inter alia, to the configuration of the discharge end of the ampule. The present application relates particularly to the said stopper or closure member, as well as to the combination therewith of the said tubular ampule.

The closure member of the present invention is characterized by a number of features adapting the same for use in an injector of the type indicated. The closure member is made of resilient material such as rubber. The closure member is generally cup-shaped and has its mouth facing the discharge orifice. Further, the stopper is provided with side walls or other parts depending from the stopper bottom which are tapered or otherwise so formed as to conform, at the end of the plunger stroke, with the interior contour of the discharge end of the ampule to effect complete expulsion of the ampule contents without unduly stressing the ampule walls. The bottom of the closure member is formed so as to be invertible at the beginning of the primary plunger stroke, as by having an annular groove on its outside, the bottom being thinner within this groove than the side walls.

It is therefore an important object of the present invention to provide, for use in a jet injector of the type indicated, an ampule having a closure member particularly adapted to cooperate with said jet injector to eject the capsule content completely within a brief period of time under a pressure that is initially high but is thereafter reduced.

Another important object of this invention is to provide a cup-shaped ampule closure member characterized by the above disclosed features and adapted for use, in combination with the ampule of said copending application, Serial No. 93,282, in a jet injector of the type indicated.

Other and further objects and features of this invention will become apparent from the following description and appended claims as illustrated by the accompanying drawings which show, by way of examples, an ampule according to this invention and a hypo jet injector. More particularly:

Figure 1 is a cross sectional view taken along the line 1—1 of Figure 2;

Figure 2 is a plan view of a closure member for an ampule;

Figure 3 is a bottom plan view of the closure member of Figure 1;

Figure 4 is a longitudinal cross sectional view of an ampule including the closure member of Figures 1 to 3, with part of the closure member shown in elevation;

Figure 5 is a fragmentary longitudinal, cross sectional view through a hypo injector having inserted therein the ampule of Figure 4 and showing the injector with its parts in the positions assumed immediately before an injection is initiated;

Figure 6 is a view similar to that of Figure 5 but showing the parts in positions assumed during the initial or high pressure stage of the injection;

Figure 7 is a view similar to that of Figure 5 but showing the parts in positions assumed in the early part of the second or low pressure stage of the injection; and Figure 8 is a view similar to that of Figure 5 but showing the parts in the positions assumed as the injection is terminated.

The injector shown in the drawings is identical with that shown in said copending application of Robert P. Scherer, Serial No. 170,101, and the same numerals are used in this application as in said copending application, whenever referring to corresponding parts, to facilitate cross reference to said copending application. For a complete description of said injector and its operation, reference is made to said copending application.

Referring now to Figure 4, there is shown a generally tubular metal ampule 71 formed with a reduced discharge nozzle 74 perforated by a discharge orifice 75 of capillary size having, for instance, a diameter of from 0.002 to 0.010 inch. The ampule is filled with medicament 72 and is closed by a cup-like follower generally indicated at 73.

The cup-like follower 73 is best illustrated in Figures 1 to 3. As shown, the follower is formed with a side wall 73a and a bottom having an outside groove 73b extending inside the side wall 73a. Otherwise, the outer surface of the follower bottom lies in one plane. The bottom portion outside the side wall 73 is designated by the reference numeral 73c, while the central bottom portion inside the groove 73b is designated by the reference numeral 73d. This central bottom portion 73d is of inverted U-shaped cross sectional form and has a thickness about one-half of the side wall 73a. The bottom portion 73c outside the groove 73b has an axial thickness about equal to the depth of the groove 73b plus the thickness of the central bottom portion 73d. Further, the outside of the groove 73b is spaced from the inside of the side wall 73a by the thickness of the legs of the U-shaped bottom portion 73d so that on inversion thereof these legs will abut against the inside of the side wall 73a without stretching.

The side wall 73a diverges from the longitudinal axis of the follower by about 3°. The lip of the follower is formed with an outer plane narrow annular surface 73e extending at a right angle to said longitudinal axis and with an inner annular surface 73f diverging from said longitudinal axis by from 25° to 35° or 45°, say, about 30° or 40°.

In Figures 5 to 8 there is shown an injector including a dosage sleeve 30 externally threaded at its end to receive an ampule holder 70. These two members jointly define an elongated cylindrical chamber adapted to receive and support an ampule 71. A flexible non-slip nose 76 of rubber or similar material such as "neoprene" covers the ampule holder 70. The reduced nozzle 74 of the ampule 71 projects through a suitable aperture in the ampule holder 70 and nose 76 so that the tip of the nozzle 74 can directly contact the skin through which the medicament 72 is to be injected.

The injector further comprises means for ejecting the capsule contents 72 such as a primary plunger 80 of smaller diameter than the ampule 71 and a secondary plunger made up of an upper disc-like portion 92 and, projecting therefrom, a sleeve-like portion 91 slidingly fitting around the primary plunger 80 and adapted to fit slidingly inside the ampule 71. Vents 33 are provided in the dosage sleeve 30 terminating in a relieved annular space 34 between the dosage sleeve 30 and the ampule holder 70, for the purpose of discharging air displaced downwardly on movement of the secondary plunger.

The ampule 71 is initially received and supported in the injector in the manner shown in Figure 5, the end of the primary plunger 80 being spaced slightly from the follower or closure member 73 and the leading edge of the secondary plunger sleeve 91 resting upon the margin 73c of the bottom of the closure member 73. In the operation of the injector, the end of the primary plunger first engages the central bottom portion 73d of the closure member 73 with an impact blow and thereafter moves further downward so as to invert and at most slightly stretch the bottom portion 73d of the closure member, as shown in Figure 6. During this time, the secondary plunger sleeve 91 remains stationary. This period of time represents the first or high pressure stage of the injection, during which the side wall 73a of the closure member remains practically stationary. The movement of the primary plunger 80 is quite rapid to build up the initial high pressure, and in fact so rapid as to preclude bodily movement by the closure member under the pressure exerted by the primary plunger. Instead, the central bottom portion 73d of the closure member is inverted.

Next, as shown in Figure 7, the primary plunger 80 continues its downward movement and the secondary plunger sleeve 91 likewise moves downwardly, so that the closure member 73 is bodily displaced downwardly. At this time, the second or low pressure stage of injection has been initiated. The lip configuration of the closure member at this time becomes of importance. The generally frusto-conical tapering form of the closure member lip prevents curling over or doubling up of the lip.

The final stage of the injection is illustrated in Figure 8. As shown, the central bottom portion 13d of the closure member is still inverted around the primary plunger 80. The lip of the closure member has entered the reduced ampule nozzle 74. Due to the divergence of the annular lip surface 73f, medicament can still escape therebetween until the last moment, so that no medicament is dammed up or trapped within the ampule. The last drop of medicament is squeezed out between the stretched bottom 13d of the closure member and the side wall 73a and between the opposed parts of the surface 73f. Note, in this connection, that the secondary plunger sleeve 91 does not descend as far as the primary plunger 80 and that the tapering form of the closure member lip aids in preventing curling up of the latter when confined in the reduced ampule nozzle 74.

As discussed hereinabove, a number of structural features of our flexible stopper or follower contribute to the cooperation between the stopper and the ampule in effecting a rapid complete two stage injection of the ampule contents. These features include the slight outward flare of the stopper side wall which assures sealing contact of the stopper side wall with the inside of the ampule. The axial length of the stopper side wall may be varied so as to assure good sealing contact without excessive frictional resistance to stopper movement within the metal ampule which would follow from the use of a stopper side wall of too great axial length. At the same time, the stopper side wall is made long enough to insure good sealing contact. It will be understood that the materials of construction of the stopper and of the metal ampule, as well as the greater or lesser smoothness of the contacting stopper and ampule surfaces, are among the factors which must be considered in determining the axial length of the stopper side wall.

Another important feature of our stopper is the tapering terminal shape of the stopper side wall which permits the side wall to enter the tapering discharge nozzle of the ampule without obstructing discharge from the nozzle.

A further important feature of our stopper is the shape of the stopper bottom which in normal or relaxed position presents essentially flat surfaces to the injector plungers while the central bottom portion is inversible or inwardly deformable with little or no stretching, in the manner of an inversible diaphragm. Thus, the internal volume of the ampule may be suddenly reduced to an appreciable extent without much, if any, stretching of the stopper material. For this purpose, the margin of the central inversible bottom portion must be thin enough to permit flexing and should be normally directed upwardly for downward flexing upon initiation of injection. Inside this margin, the stopper bottom may be thicker.

A further important feature is the spacing from the stopper side wall and the thickness of the inversible stopper bottom. Note that on inversion the central stopper bottom portion abuts the stopper side wall, to squeeze out ampule contents. But the inverted stopper bottom does not thereby subject the stopper side wall to additional pressure, as would be the case, for instance, if the inverted stopper bottom would be thicker than the space left available between the stopper side wall and the primary plunger (after the primary plunger has descended far enough to effect inversion of the stopper bottom).

Another important feature is the total cross sectional area of the inverted stopper which is controlled so as to permit entry of the lower end portion into the tapering discharge end without obstructing complete discharge of the ampule contents but at the same time substantially filling the discharge end of the ampule to insure complete discharge of the ampule contents. Note that complete discharge is secured with little, if any, stretching of the stopper material.

The resilient material making up the closure member 73 should be capable of at least 500% elongation. Its tensile strength is suitably regulated so as to fall within the range of from 1500 to 3000, and preferably from 2000 to 3000 lbs. per square inch. Compressibility is preferably regulated to fall within the range of from 60 to 70 Shore A as measured using the Shore hardness durometer type A.

The frictional resistance against follower movement with the capsule depends of course upon the nature of the resilient material of which the follower is made, upon the nature of the metal of which the ampule is made and upon the smoothness of the contacting surfaces. The ampule is suitably made of the alloy disclosed and claimed in the copending application of Leon V. Whipple, et al., Serial No. 93,286, filed May 14, 1949, entitled "Alloy and Container Made Therefrom." When the ampule is made from the alloy of said copending application, the closure member may be made of a composition tabulated as follows:

| Ingredient | Parts by Wt. |
|---|---|
| Butadiene-acrylonitrile copolymer (76:24) | 100 |
| Carbon black | 50–70 |
| Zinc oxide (C. P.) | 3–6 |
| Stearic acid (quadruple pressed, triple distilled) | ½–1½ |
| Paraffin wax (m P 132° C.) | 1–7 |
| White mineral oil (U. S. P.) | 3–10 |
| Vulcanizing agent (E. G. ethyl thiuram disulfide) | 1–3 |

The tabulated composition may be cured at 312° F. for from about 5 to 30 minutes. A curing period of 10 minutes is preferred.

Any suitable natural or synthetic rubber or the like can be used. When other gum stocks are used than the specific nitrile rubber disclosed, the other ingredients may be used in other proportions. The stearic acid, paraffin wax and mineral oil are added in amounts sufficient to prevent rubber to metal adhesion, but not enough to be liberated from the rubber, as on storage or on subjection to pressure.

Many details of structure and composition may be varied without departing from the principles of this invention. It is therefore not our purpose to limit the patent granted on this invention otherwise than necessitated by the scope of the appended claims.

We claim:
1. In a jet injection ampule, a tubular shell serving as a medicament container and having one end tapered and closed except for a minute ejection orifice, the other end being open, and a resilient generally cup-shaped closure member for said open shell and disposed therein with its mouth facing said closed ampule end, the bottom of said closure member being formed with an inner central recess and with an outer axially extending annular groove surrounding said recess permitting axial movement of the recessed bottom portion, the side wall of said closure member being of uniform thickness, inclined outwardly with respect to the longitudinal axis of said closure member, and being formed with an outwardly cylindrical lip bounded terminally by an inner outwardly inclined annular surface.

2. A resilient generally cup-shaped imperforate closure and plunger member for a tubular ampule, said closure member having a bottom and side wall, said side wall being of uniform thickness, inclined outwardly, and formed with an outwardly cylindrical lip bounded terminally by an inner outwardly inclined annular surface, the bottom of said closure member having a central recess in its inner side and formed with an outer axially extending annular groove inside said side wall and permitting axial flexing of said recessed bottom portion.

ROBERT PAULI SCHERER.
JOHN OTTO SCHERER.
LEON V. WHIPPLE.

References Cited in the file of this patent

UNITED STATES PATENTS

| Number | Name | Date |
|---|---|---|
| 1,770,220 | Smith | July 8, 1930 |
| 1,929,247 | Hein | Oct. 3, 1933 |
| 1,987,146 | Hein | Jan. 8, 1935 |
| 2,098,524 | Smith | Nov. 9, 1937 |
| 2,398,544 | Lockhart | Apr. 16, 1946 |
| 2,514,575 | Hein | July 11, 1950 |
| 2,526,365 | Jorgensen | Oct. 17, 1950 |